US012598242B2

(12) United States Patent
Hong

(10) Patent No.: US 12,598,242 B2
(45) Date of Patent: *Apr. 7, 2026

(54) METHOD FOR SENDING MULTIMODAL DATA

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 153 days.

This patent is subject to a terminal disclaimer.

(21) Appl. No.: 18/013,544

(22) PCT Filed: Jul. 9, 2020

(86) PCT No.: PCT/CN2020/101160

§ 371 (c)(1),
(2) Date: Dec. 28, 2022

(87) PCT Pub. No.: WO2022/006823

PCT Pub. Date: Jan. 13, 2022

(65) Prior Publication Data

US 2023/0300220 A1     Sep. 21, 2023

(51) Int. Cl.
H04L 67/63 (2022.01)

(52) U.S. Cl.
CPC .................................... H04L 67/63 (2022.05)

(58) Field of Classification Search
CPC ...................................................... H04L 67/63
See application file for complete search history.

(56) References Cited

U.S. PATENT DOCUMENTS

| | | | |
|---|---|---|---|
| 9,378,455 | B2 | 6/2016 | Yufik |
| 9,563,843 | B2 | 2/2017 | Yufik |
| 11,277,338 | B2 * | 3/2022 | Drake ..................... H04L 45/64 |

(Continued)

FOREIGN PATENT DOCUMENTS

| | | |
|---|---|---|
| CN | 101911064 A | 12/2010 |
| CN | 102833242 A | 12/2012 |

(Continued)

OTHER PUBLICATIONS

International Search Report of PCT/CN2020/101160, dated Mar. 30, 2021, with English translation, (4p).

(Continued)

*Primary Examiner* — Dhairya A Patel
(74) *Attorney, Agent, or Firm* — Arch & Lake LLP

(57) ABSTRACT

A multimodal data sending method includes: acquiring at least one piece of data, wherein each of the at least one piece of data has a different modality; determining the identifier corresponding to the modality of each piece of data; and sending at least one piece of data and at least one identifier to a centralized processing device. The identifier corresponding to the modality of each piece of data can be determined, such that not only can at least one piece of data be sent to the centralized processing device, but the identifier corresponding to the modality of each piece of data can be sent to the centralized processing device, so as to enable the centralized processing device to determine the modality of each piece of data according to the identifier.

20 Claims, 8 Drawing Sheets acquiring at least one piece of data, in which each of the at least one piece of data belongs to a different modality ⟋ S101 determining an identifier corresponding to the modality to which each piece of data belongs ⟋ S102 sending the at least one piece of data and at least one identifier to a centralized processing device ⟋ S103

(56)     References Cited

U.S. PATENT DOCUMENTS

| | | | | |
|---|---|---|---|---|
| 12,003,604 | B2* | 6/2024 | Hong ...................... | H04L 67/60 |
| 2016/0142308 | A1* | 5/2016 | Gage ....................... | H04W 4/70 |
| | | | | 370/392 |
| 2016/0189038 | A1* | 6/2016 | Sanjay .................... | G06N 5/04 |
| | | | | 706/55 |
| 2016/0247066 | A1 | 8/2016 | Yufik | |
| 2016/0360355 | A1* | 12/2016 | Vudali ................... | H04W 4/20 |
| 2017/0289774 | A1* | 10/2017 | Kuang ................. | H04W 4/021 |
| 2018/0089565 | A1 | 3/2018 | Yufik | |
| 2020/0084519 | A1 | 3/2020 | Pappu et al. | |
| 2020/0153743 | A1* | 5/2020 | Liu ....................... | H04L 45/306 |
| 2021/0383799 | A1* | 12/2021 | Hewitt .................... | G06N 7/01 |
| 2023/0291811 | A1* | 9/2023 | Hong ................ | H04N 21/8547 |
| 2023/0318973 | A1* | 10/2023 | Rosen .................... | H04L 67/10 |
| | | | | 370/392 |

FOREIGN PATENT DOCUMENTS

| | | | |
|---|---|---|---|
| CN | 107959821 | A | 4/2018 |
| CN | 110009003 | A | 7/2019 |
| CN | 110990595 | A | 4/2020 |
| EP | 2733908 | A1 | 5/2014 |

OTHER PUBLICATIONS

International Search Report issued in EP Application No. 20943935.5 dated Feb. 21, 2024, (8p).
First Office Action issued to Chinese Application No. 2020800014633 dated Apr. 30, 2025 with English translation, (22p).
Second Office Action issued in CN Application No. 202080001463.3 dated Jan. 1, 2026 with English translation, (15p).

* cited by examiner

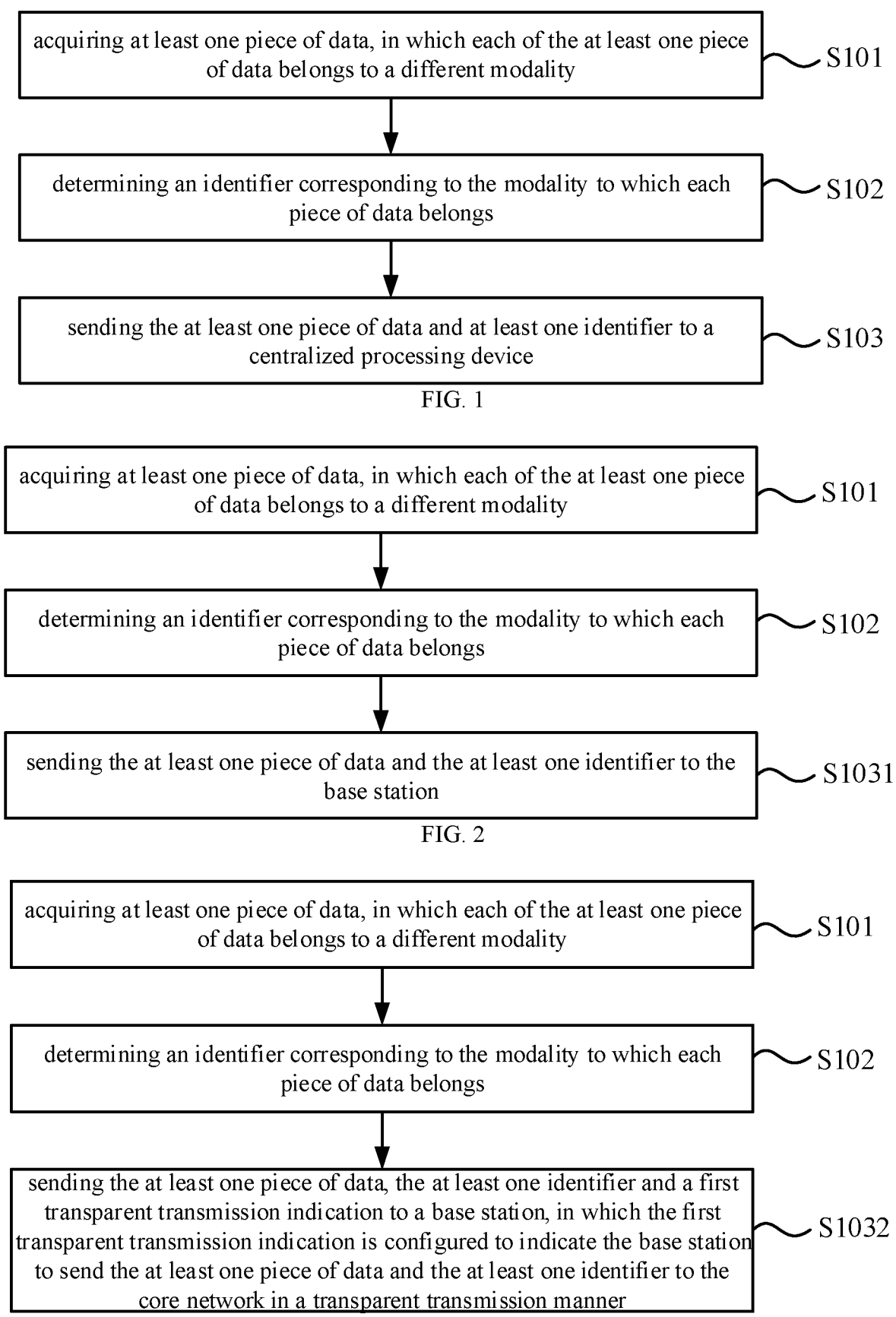

acquiring at least one piece of data, in which each of the at least one piece of data belongs to a different modality    S101 determining an identifier corresponding to the modality to which each piece of data belongs    S102 sending the at least one piece of data and at least one identifier to a centralized processing device    S103

FIG. 1 acquiring at least one piece of data, in which each of the at least one piece of data belongs to a different modality    S101 determining an identifier corresponding to the modality to which each piece of data belongs    S102 sending the at least one piece of data and the at least one identifier to the base station    S1031

FIG. 2 acquiring at least one piece of data, in which each of the at least one piece of data belongs to a different modality    S101 determining an identifier corresponding to the modality to which each piece of data belongs    S102 sending the at least one piece of data, the at least one identifier and a first transparent transmission indication to a base station, in which the first transparent transmission indication is configured to indicate the base station to send the at least one piece of data and the at least one identifier to the core network in a transparent transmission manner    S1032

FIG. 3

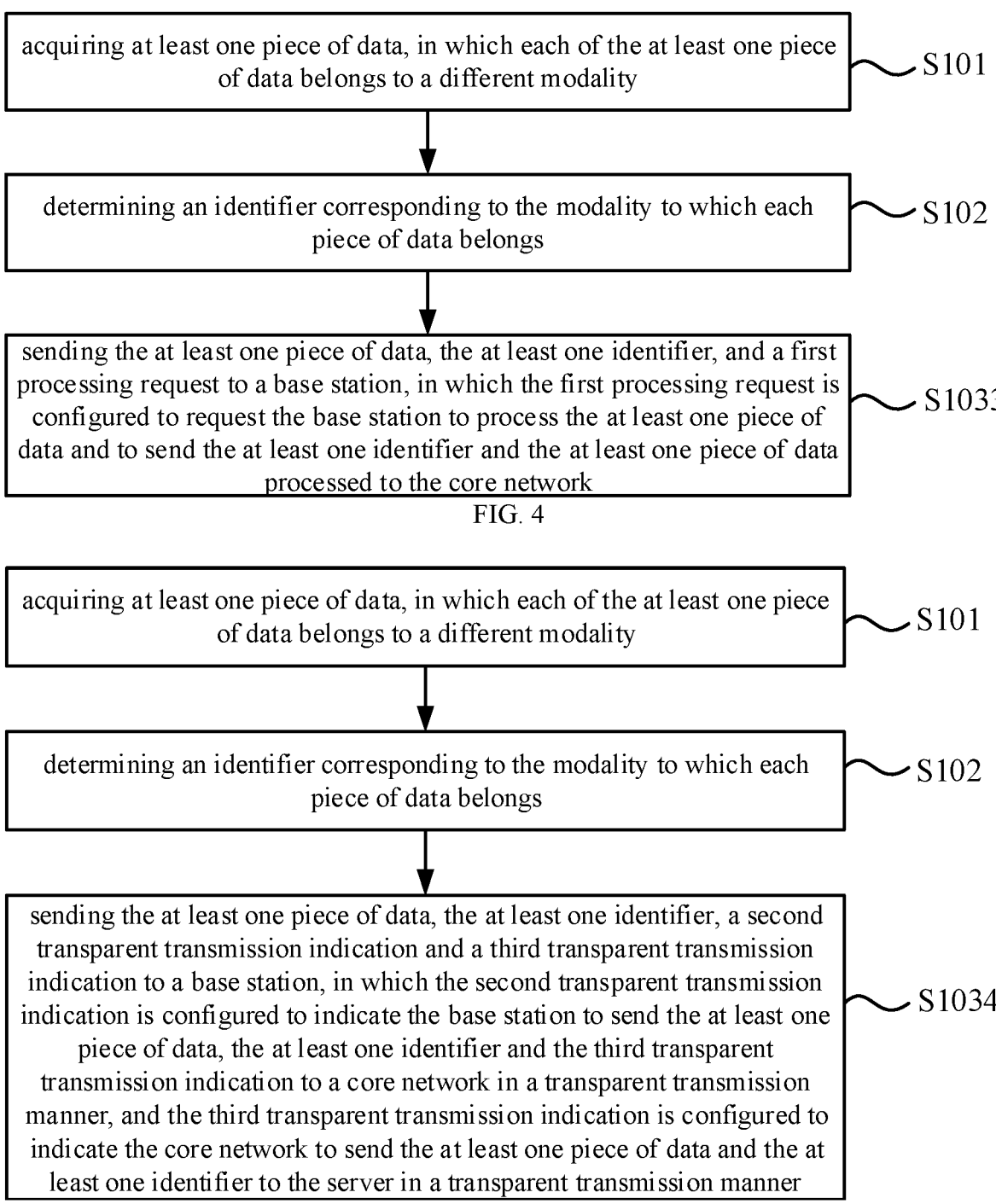

acquiring at least one piece of data, in which each of the at least one piece of data belongs to a different modality ~ S101 determining an identifier corresponding to the modality to which each piece of data belongs ~ S102 sending the at least one piece of data, the at least one identifier, and a first processing request to a base station, in which the first processing request is configured to request the base station to process the at least one piece of data and to send the at least one identifier and the at least one piece of data processed to the core network ~ S1033

FIG. 4 acquiring at least one piece of data, in which each of the at least one piece of data belongs to a different modality ~ S101 determining an identifier corresponding to the modality to which each piece of data belongs ~ S102 sending the at least one piece of data, the at least one identifier, a second transparent transmission indication and a third transparent transmission indication to a base station, in which the second transparent transmission indication is configured to indicate the base station to send the at least one piece of data, the at least one identifier and the third transparent transmission indication to a core network in a transparent transmission manner, and the third transparent transmission indication is configured to indicate the core network to send the at least one piece of data and the at least one identifier to the server in a transparent transmission manner ~ S1034

FIG. 5

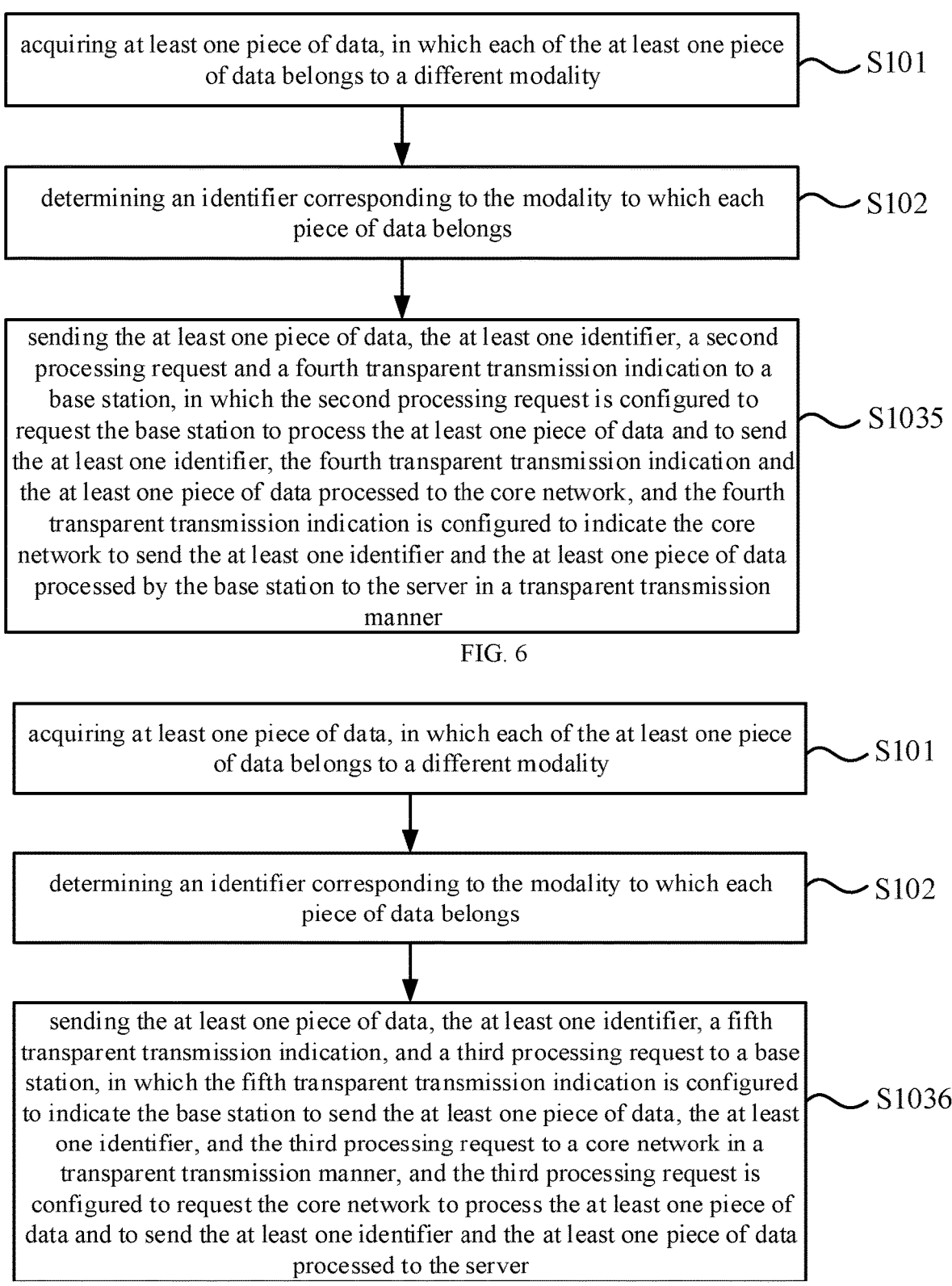

acquiring at least one piece of data, in which each of the at least one piece of data belongs to a different modality          S101 determining an identifier corresponding to the modality to which each piece of data belongs          S102 sending the at least one piece of data, the at least one identifier, a second processing request and a fourth transparent transmission indication to a base station, in which the second processing request is configured to request the base station to process the at least one piece of data and to send the at least one identifier, the fourth transparent transmission indication and the at least one piece of data processed to the core network, and the fourth transparent transmission indication is configured to indicate the core network to send the at least one identifier and the at least one piece of data processed by the base station to the server in a transparent transmission manner          S1035

FIG. 6 acquiring at least one piece of data, in which each of the at least one piece of data belongs to a different modality          S101 determining an identifier corresponding to the modality to which each piece of data belongs          S102 sending the at least one piece of data, the at least one identifier, a fifth transparent transmission indication, and a third processing request to a base station, in which the fifth transparent transmission indication is configured to indicate the base station to send the at least one piece of data, the at least one identifier, and the third processing request to a core network in a transparent transmission manner, and the third processing request is configured to request the core network to process the at least one piece of data and to send the at least one identifier and the at least one piece of data processed to the server          S1036

FIG. 7

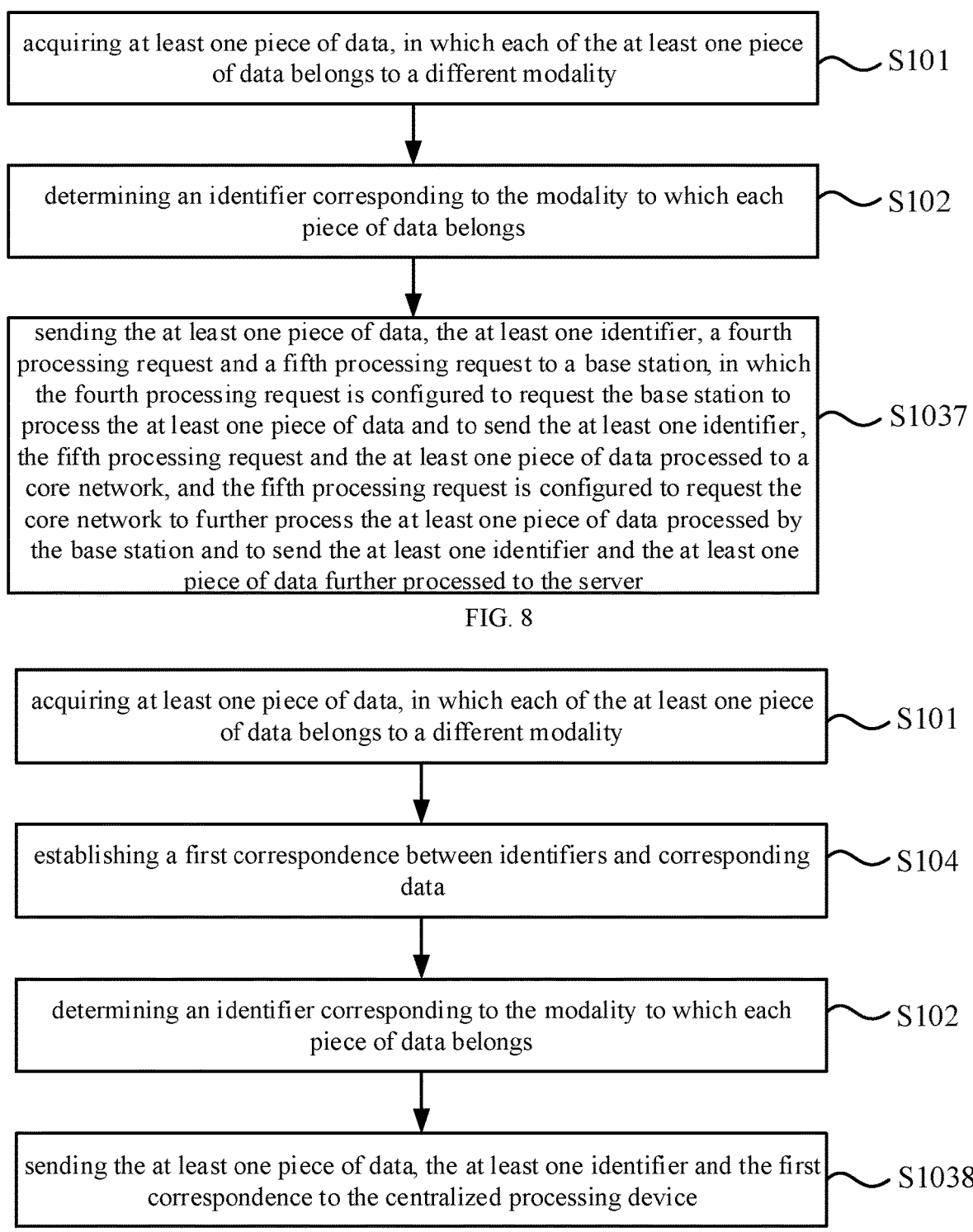

acquiring at least one piece of data, in which each of the at least one piece of data belongs to a different modality　　S101 determining an identifier corresponding to the modality to which each piece of data belongs　　S102 sending the at least one piece of data, the at least one identifier, a fourth processing request and a fifth processing request to a base station, in which the fourth processing request is configured to request the base station to process the at least one piece of data and to send the at least one identifier, the fifth processing request and the at least one piece of data processed to a core network, and the fifth processing request is configured to request the core network to further process the at least one piece of data processed by the base station and to send the at least one identifier and the at least one piece of data further processed to the server　　S1037

FIG. 8 acquiring at least one piece of data, in which each of the at least one piece of data belongs to a different modality　　S101 establishing a first correspondence between identifiers and corresponding data　　S104 determining an identifier corresponding to the modality to which each piece of data belongs　　S102 sending the at least one piece of data, the at least one identifier and the first correspondence to the centralized processing device　　S1038

FIG. 9

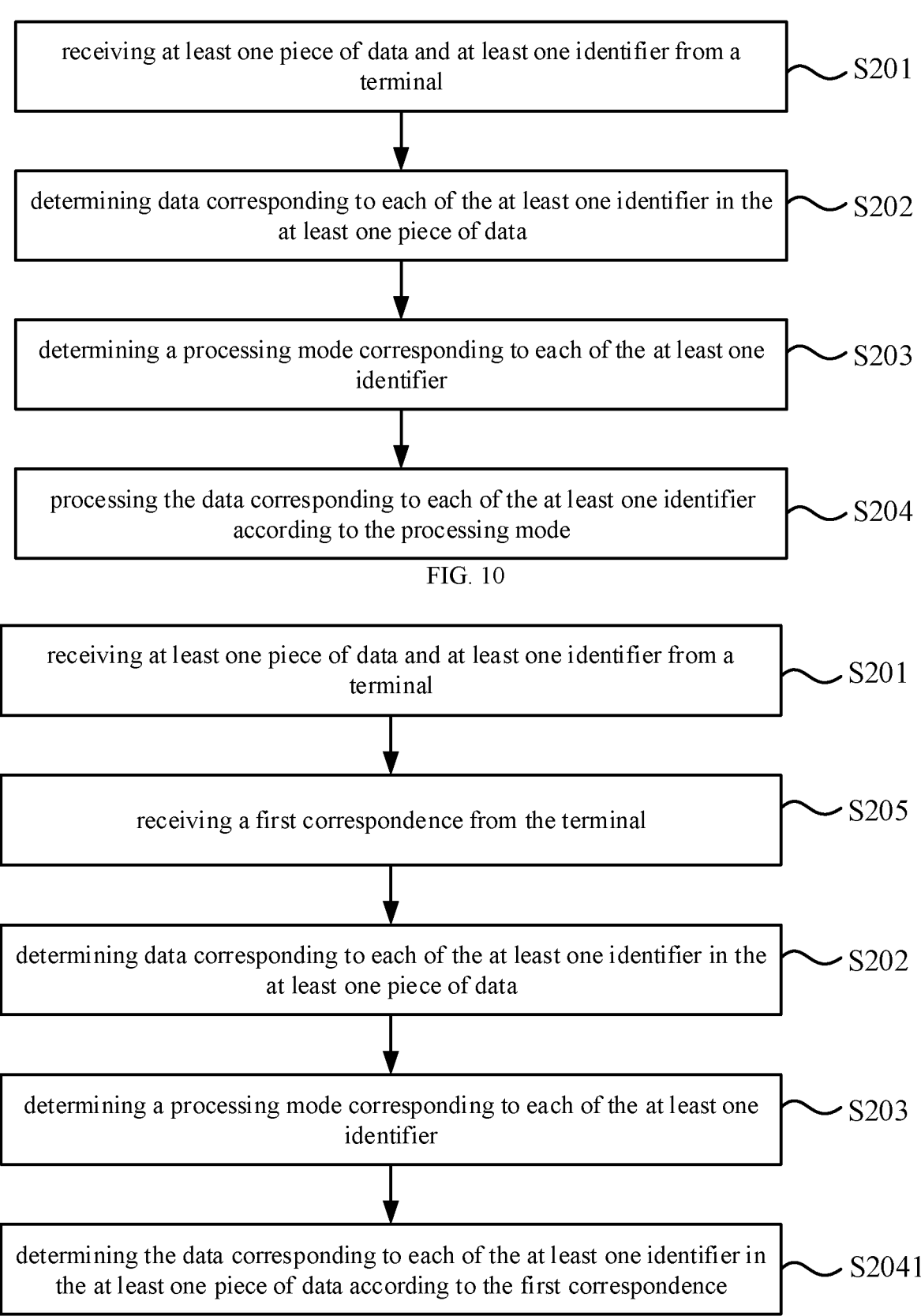

receiving at least one piece of data and at least one identifier from a terminal — S201 determining data corresponding to each of the at least one identifier in the at least one piece of data — S202 determining a processing mode corresponding to each of the at least one identifier — S203 processing the data corresponding to each of the at least one identifier according to the processing mode — S204

FIG. 10 receiving at least one piece of data and at least one identifier from a terminal — S201 receiving a first correspondence from the terminal — S205 determining data corresponding to each of the at least one identifier in the at least one piece of data — S202 determining a processing mode corresponding to each of the at least one identifier — S203 determining the data corresponding to each of the at least one identifier in the at least one piece of data according to the first correspondence — S2041

FIG. 11

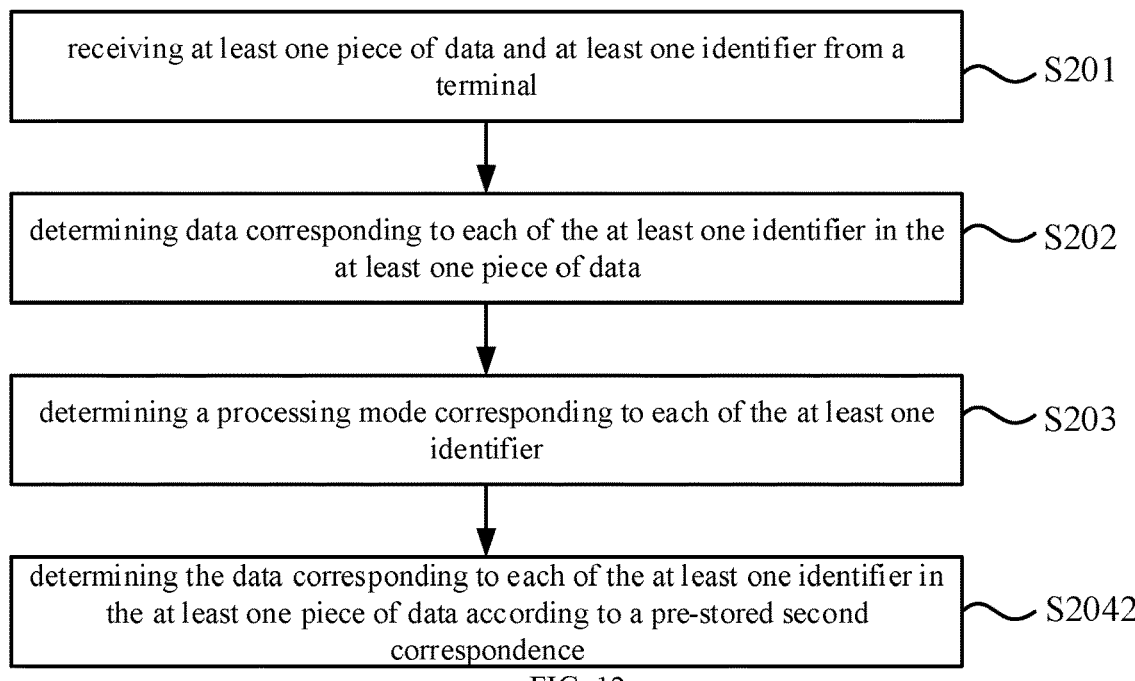

receiving at least one piece of data and at least one identifier from a terminal    S201 determining data corresponding to each of the at least one identifier in the at least one piece of data    S202 determining a processing mode corresponding to each of the at least one identifier    S203 determining the data corresponding to each of the at least one identifier in the at least one piece of data according to a pre-stored second correspondence    S2042

FIG. 12

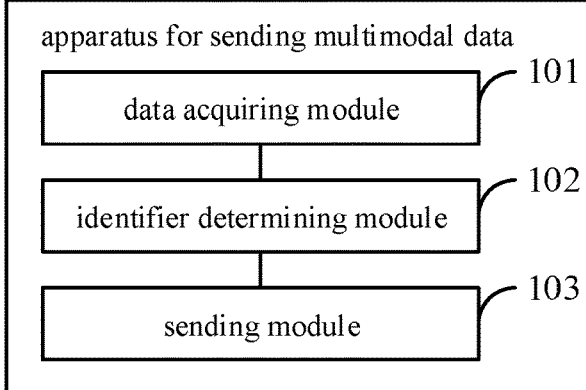

apparatus for sending multimodal data data acquiring module    101 identifier determining module    102 sending module    103

FIG. 13

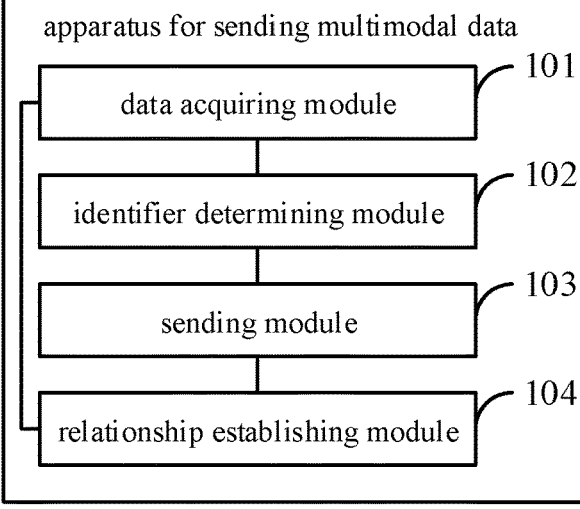

apparatus for sending multimodal data data acquiring module    101 identifier determining module    102 sending module    103 relationship establishing module    104

FIG. 14

METHOD FOR SENDING MULTIMODAL DATA

CROSS-REFERENCE TO RELATED APPLICATION

This application is a national phase under 35 USC § 371 of International Patent Application No. PCT/CN2020/101160, filed on Jul. 9, 2020, the entire contents of which are incorporated herein by reference for all purposes.

FIELD

The present disclosure relates to the technical field of communication, and in particular to a method for sending multimodal data, an apparatus for sending multimodal data, a method for processing multimodal data, an apparatus for processing multimodal data, an electronic device, and a computer-readable storage medium.

BACKGROUND

With the formal commercialization of 5G technology, research on 6G technology has been put on the agenda. Intelligent interaction is a possible important application scenario in the 6G technology. The intelligent interaction refers to intelligent interaction between agents (including people and things). Most of the existing agent interactions are passive and depend on the required input, such as acoustic or visual interaction between people and smart homes. The smart homes passively receive data input by people, and the input data are all unimodal.

In the 6G era, a multi-modality will become a normal state. Inputs from a plurality of devices or a plurality of inputs from one device are sent to a centralized processing device, which will comprehensively process these inputs, thus finally obtaining one or more outputs that meet the needs of users, and the plurality of outputs may also be output by the plurality of devices or one device.

SUMMARY

According to a first aspect of the embodiments of the present disclosure, there is provided a method for sending multimodal data, which is applied to a terminal. The method includes acquiring at least one piece of data, in which each of the at least one piece of data belongs to a different modality; determining an identifier corresponding to the modality to which each piece of data belongs; and sending the at least one piece of data and at least one identifier to a centralized processing device.

According to a second aspect of the embodiments of the present disclosure, there is provided a method for processing multimodal data, which is applied to a centralized processing device. The method includes receiving at least one piece of data and at least one identifier from a terminal; determining data corresponding to each of the at least one identifier in the at least one piece of data; determining a processing mode corresponding to each of the at least one identifier; and processing the data corresponding to each of the at least one identifier according to the processing mode.

According to a third aspect of the embodiments of the present disclosure, there is provided an electronic device, including a processor; and a memory for storing instructions executable by the processor; in which the processor is configured to implement the method for sending multimodal data described in any of the above-mentioned embodiments, and/or the method for processing multimodal data described in any of the above-mentioned embodiments.

According to a fourth aspect of the embodiments of the present disclosure, there is provided a computer-readable storage medium having stored therein a computer program that, when executed by a processor, causes the processor to implement steps of the method for sending multimodal data described in any of the above-mentioned embodiments, and/or steps of the method for processing multimodal data described in any of the above-mentioned embodiments.

BRIEF DESCRIPTION OF THE DRAWINGS

In order to illustrate the technical solutions in embodiments of the present disclosure more clearly, accompanying drawings used in the description of the embodiments will be briefly introduced below, and it is obvious that the accompanying drawings in the following description are only some embodiments of the present disclosure. For those skilled in the art, other accompanying drawings can also be obtained from these accompanying drawings without creative labor.

FIG. 1 is a flow chart showing a method for sending multimodal data according to an embodiment of the present disclosure.

FIG. 2 is a flow chart showing another method for sending multimodal data according to an embodiment of the present disclosure.

FIG. 3 is a flow chart showing yet another method for sending multimodal data according to an embodiment of the present disclosure.

FIG. 4 is a flow chart showing yet another method for sending multimodal data according to an embodiment of the present disclosure.

FIG. 5 is a flow chart showing yet another method for sending multimodal data according to an embodiment of the present disclosure.

FIG. 6 is a flow chart showing yet another method for sending multimodal data according to an embodiment of the present disclosure.

FIG. 7 is a flow chart showing yet another method for sending multimodal data according to an embodiment of the present disclosure.

FIG. 8 is a flow chart showing yet another method for sending multimodal data according to an embodiment of the present disclosure.

FIG. 9 is a flow chart showing yet another method for sending multimodal data according to an embodiment of the present disclosure.

FIG. 10 is a flow chart showing a method for processing multimodal data according to an embodiment of the present disclosure.

FIG. 11 is a flow chart showing another method for processing multimodal data according to an embodiment of the present disclosure.

FIG. 12 is a flow chart showing yet another method for processing multimodal data according to an embodiment of the present disclosure.

FIG. 13 is a block diagram showing an apparatus for sending multimodal data according to an embodiment of the present disclosure.

FIG. 14 is a block diagram showing another apparatus for sending multimodal data according to an embodiment of the present disclosure.

DETAILED DESCRIPTION

Figure 15:
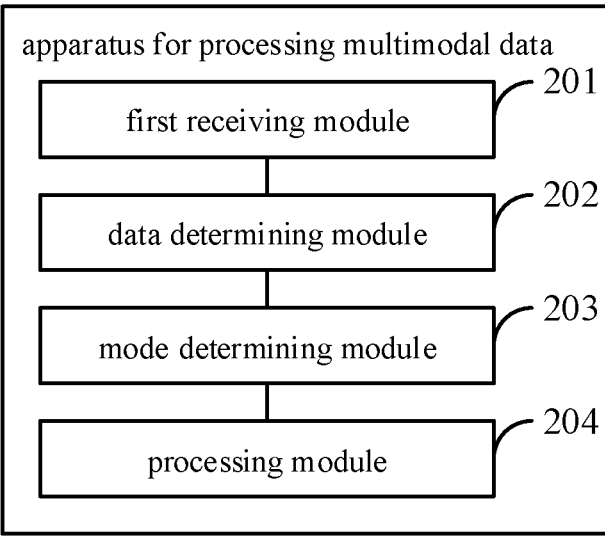
FIG. 15 is a block diagram showing an apparatus for processing multimodal data according to an embodiment of the present disclosure.

The technical solutions in embodiments of the present disclosure will be clearly and completely described below with reference to accompanying drawings in the embodiments of the present disclosure. Obviously, the described embodiments are only part of the embodiments of the present disclosure, but not all of the embodiments. Based on the embodiments in the present disclosure, all other embodiments obtained by those skilled in the art without creative labor shall fall within the protection scope of the present disclosure.

In view of this, embodiments of the present disclosure provide a method for sending multimodal data, an apparatus for sending multimodal data, a method for processing multimodal data, an apparatus for processing multimodal data, an electronic device, and a computer-readable storage medium to solve the technical problems in the related art.

FIG. 1 is a flow chart showing a method for sending multimodal data according to an embodiment of the present disclosure. The method shown in the embodiment may be applied to a terminal. The terminal includes, but is not limited to, an electronic device, such as a mobile phone, a tablet computer, a wearable device, a sensor, and an Internet of Things device.

The terminal can communicate with a base station as a user equipment. The base station may be a 5G base station, or a 6G base station. The base station can further communicate with a core network, and the core network can further communicate with a server in a network, for example, based on an application programming interface (API).

As shown in FIG. 1, the method may include step S101 to step S103.

In step S101, at least one piece of data is acquired, in which each of the at least one piece of data belongs to a different modality.

In step S102, an identifier corresponding to the modality to which each piece of data belongs is determined.

In step S103, the at least one piece of data and at least one identifier are sent to a centralized processing device.

In an embodiment, for the at least one piece of data acquired by the terminal, each piece of data may belong to the different modality, that is, each piece of data comes from a different input interface. For example, the at least one piece of data includes two pieces of data, in which one is audio data x, and a modality to which it belongs is an audio interface, that is, the audio data is acquired through the audio interface. The other is video data y, and a modality to which it belongs is a video interface, that is, the video data is acquired through the video interface. After multimodal data is sent to the centralized processing device, the centralized processing device can process the multimodal data. For example, for the above-mentioned audio data x and video data y, a real-time translation can be performed, in which the audio data x is voice input by a user, and the video data y is an action of a user's mouth, and processing is performed according to a function z=f(x,y) to obtain z as a translation result output.

In the related technology, there is no need to consider a modality to which the data belongs due to the data interacted between agents are all unimodal, and the data can be processed directly according to a fixed modality processing mode. However, in the 6G technology, since the data interacted between agents is multimodal, if the processing is performed according to the method in the related art, the centralized processing device cannot determine a modality to which the data belongs according to the data itself, resulting in an error in the processing.

For example, for the above-mentioned audio data x and video data y, if they are directly sent to the centralized processing device in accordance with the method in the related art, for the centralized processing device, only two pieces of data are received. It is impossible to determine which piece of data comes from the audio interface and which data comes from the video interface. For example, for the above-mentioned f(x,y)=ax+by, when the centralized processing device substitutes the audio data x and the video data y into f(x,y), it may be calculated according to ay+bx, which is different from the correct calculation mode ax+by, resulting in an error in the calculation result.

According to the embodiments of the present disclosure, the identifier corresponding to the modality to which each piece of data belongs can be determined. For example, for the above-mentioned audio data x and video data y, it can be determined that the modality to which the audio data x belongs is the audio interface, and a corresponding identifier is A, and the modality to which the video data y belongs is the video interface, and a corresponding identifier is B. An identifier of each modality can be set as required, and is not limited to the above-mentioned A and B. A specific value may be an integer for transmission when identifying a corresponding numerical value.

Further, not only the at least one piece of data may be sent to the centralized processing device, but also the identifier corresponding to the modality of each piece of data may be sent to the centralized processing device. For example, the at least one piece of data is n pieces of data, then at least one identifier may be n identifiers, so that the centralized processing device can determine the modality of each piece of data according to the identifier, and then accurately process the data according to the processing mode corresponding to the modality, and then obtain accurate processing results.

For example, for the above-mentioned audio data x and video data y, in addition to sending the audio data x and the video data y to the centralized processing device, the identifier A and the identifier B can also be sent to the centralized processing device. The centralized processing device can determine that the modality to which the audio data x belongs is the audio interface according to the identifier A, and the modality to which the video data y belongs is the video interface according to the identifier B. Then, one can substitute x after a coefficient a and y after a coefficient b according to the correct processing mode when substituting the audio data x and the video data y into f(x, y), so that the calculation is performed according to the correct calculation mode ax+by so as to ensure the accuracy of the calculation results.

In an embodiment, the centralized processing device may be an entity device, or a function integrated on the entity device. The entity device may be, for example, a base station, a core network (a core network device), a server, or the like. An illustrative description is given below in the case where the centralized processing device is disposed at the base station, the core network, and the server.

FIG. 2 is a flow chart showing another method for sending multimodal data according to an embodiment of the present disclosure. As shown in FIG. 2, the centralized processing device is disposed at a base station, and sending the at least one piece of data and the at least one identifier to the centralized processing device includes step S1031.

In step S1031, the at least one piece of data and the at least one identifier are sent to the base station.

In an embodiment, when the centralized processing device is disposed at the base station, a terminal may directly send the at least one piece of data and the at least one identifier to the base station.

FIG. 3 is a flow chart showing yet another method for sending multimodal data according to an embodiment of the present disclosure. As shown in FIG. 3, the centralized processing device is disposed in a core network, and sending the at least one piece of data and the at least one identifier to the centralized processing device includes step S1032.

In step S1032, the at least one piece of data, the at least one identifier and a first transparent transmission indication are sent to a base station, in which the first transparent transmission indication is configured to indicate the base station to send the at least one piece of data and the at least one identifier to the core network in a transparent transmission manner.

In an embodiment, when the centralized processing device is disposed in the core network, the terminal needs to travel through the base station in a process of sending the at least one piece of data and the at least one identifier to the core network. The terminal may also send the first transparent transmission indication when sending the at least one piece of data and the at least one identifier to the base station. The base station is indicated to send the at least one piece of data and the at least one identifier to the core network in a transparent transmission manner through the first transparent transmission indication, so that the base station does not process the data.

FIG. 4 is a flow chart showing yet another method for sending multimodal data according to an embodiment of the present disclosure. As shown in FIG. 4, the centralized processing device is disposed in a core network, and sending the at least one piece of data and the at least one identifier to the centralized processing device includes step S1033.

In step S1033, the at least one piece of data, the at least one identifier, and a first processing request are sent to a base station, in which the first processing request is configured to request the base station to process the at least one piece of data and to send the at least one identifier and the at least one piece of data processed to the core network.

In an embodiment, when the centralized processing device is disposed in the core network, the terminal needs to travel through the base station in a process of sending the at least one piece of data and the at least one identifier to the core network. The terminal may also send the first processing request when sending the at least one piece of data and the at least one identifier to the base station. The base station is requested to process the at least one piece of data through the first processing request, and then sends the at least one identifier and the at least one piece of data processed to the core network.

It is to be noted that, in the embodiment and subsequent embodiments, the processing modes of the base station for the at least one piece of data may be different based on different processing requests, or the processing mode may be determined by the base station itself. For example, a processing process may be as follows: the base station determines the modality to which each piece of data belongs according to the at least one identifier, and determines a quality of service (QoS) of the corresponding data in a transmission process according to the modality.

In some embodiments, the centralized processing device is disposed in a core network, and sending the at least one piece of data and the at least one identifier to the centralized processing device includes sending the at least one piece of data and the at least one identifier to a base station, in which the at least one piece of data and the at least one identifier are contained in first preset information, and the base station processes contents in the first preset information by default and sends the first preset information processed to the core network; or sending the at least one piece of data and the at least one identifier to a base station, in which the at least one piece of data and the at least one identifier are contained in second preset information, and the base station sends the second preset information to the core network in a transparent transmission manner by default.

In an embodiment, the base station may also decide to transparently transmit or process the data in an implicit manner in addition to the above-mentioned embodiments where the base station decides to transparently transmit or process the data according to the transparent transmission indication or the transparent transmission request sent by the terminal.

For example, if the base station processes contents in the first preset information by default, the base station will process the at least one piece of data by default when the terminal provides the at least one piece of data and the at least one identifier in the first preset information and sends the first preset information to the base station. The first preset information may be, for example, a RRCSetupComplete signaling.

For example, if the base station sends the second preset information to the core network in a transparent transmission manner by default, the base station will send the at least one piece of data to the core network in a transparent transmission manner when the terminal provides the at least one piece of data and the at least one identifier in the second preset information and sends the second preset information to the base station. The second preset information may be, for example, a dedicatedNAS-Message.

It is to be noted that, the terminal may determine whether the at least one piece of data needs to be processed by the base station. Then, the terminal may provide the at least one piece of data and the at least one identifier in the first preset information and send the first preset information to the base station when the at least one piece of data needs to be processed by the base station. Alternatively, the terminal may provide the at least one piece of data and the at least one identifier in the second preset information and send the second preset information to the base station when the at least one piece of data does not need to be processed by the base station.

FIG. 5 is a flow chart showing yet another method for sending multimodal data according to an embodiment of the present disclosure. As shown in FIG. 5, the centralized processing device is disposed at a server, and sending the at least one piece of data and the at least one identifier to the centralized processing device includes step S1034.

In step S1034, the at least one piece of data, the at least one identifier, a second transparent transmission indication and a third transparent transmission indication are sent to a base station, in which the second transparent transmission indication is configured to indicate the base station to send the at least one piece of data, the at least one identifier to a core network in a transparent transmission manner, and the third transparent transmission indication is configured to indicate the core network to send the at least one piece of data and the at least one identifier to the server in a transparent transmission manner.

In an embodiment, when the centralized processing device is disposed at the server, the terminal needs to travel through the base station and the core network in a process of sending the at least one piece of data and the at least one identifier to the core network.

The terminal may also send the second transparent transmission indication and the third transparent transmission indication when sending the at least one piece of data and the at least one identifier to the base station, and indicate the base station to send the at least one piece of data, the at least one identifier and the third transparent transmission indication to the core network in a transparent transmission manner through the second transparent transmission indication.

The core network is indicated to send the at least one piece of data and the at least one identifier to the server in a transparent transmission manner through the third transparent transmission indication, so that neither the base station nor the core network will process the data.

FIG. 6 is a flow chart showing yet another method for sending multimodal data according to an embodiment of the present disclosure. As shown in FIG. 6, the centralized processing device is disposed at a server, and sending the at least one piece of data and the at least one identifier to the centralized processing device includes step S1035.

In step S1035, the at least one piece of data, the at least one identifier, a second processing request and a fourth transparent transmission indication are sent to a base station, in which the second processing request is configured to request the base station to process the at least one piece of data and to send the at least one identifier, the fourth transparent transmission indication and the at least one piece of data processed to the core network, and the fourth transparent transmission indication is configured to indicate the core network to send the at least one identifier and the at least one piece of data processed by the base station to the server in a transparent transmission manner.

In an embodiment, when the centralized processing device is disposed at the server, the terminal needs to travel through the base station and the core network in a process of sending the at least one piece of data and the at least one identifier to the core network.

The terminal may also send the second processing request and the fourth transparent transmission indication when sending the at least one piece of data and the at least one identifier to the base station, and request the base station to process the at least one piece of data and send the at least one identifier, the fourth transparent transmission indication and the at least one piece of data processed to the core network through the second processing request.

The core network is indicated to send the at least one identifier and the at least one piece of data processed by the base station to the server in a transparent transmission manner through the fourth transparent transmission indication, so that the base station processes the data, and the core network does not process the data.

FIG. 7 is a flow chart showing yet another method for sending multimodal data according to an embodiment of the present disclosure. As shown in FIG. 7, the centralized processing device is disposed at a server, and sending the at least one piece of data and the at least one identifier to the centralized processing device includes step S1036.

In step S1036, the at least one piece of data, the at least one identifier, a fifth transparent transmission indication, and a third processing request are sent to a base station, in which the fifth transparent transmission indication is configured to indicate the base station to send the at least one piece of data, the at least one identifier, and the third processing request to a core network in a transparent transmission manner, and the third processing request is configured to request the core network to process the at least one piece of data and to send the at least one identifier and the at least one piece of data processed to the server.

In an embodiment, when the centralized processing device is disposed at the server, the terminal needs to travel through the base station and the core network in a process of sending the at least one piece of data and the at least one identifier to the core network.

The terminal may also send the fifth transparent transmission indication and the third processing request when sending the at least one piece of data and the at least one identifier to the base station, and indicate the base station to send the at least one piece of data, the at least one identifier, and the third processing request to the core network in a transparent transmission manner through the fifth transparent transmission indication.

The core network is requested to process the at least one piece of data and to send the at least one identifier and the at least one piece of data processed to the server through the third processing request, so that the base station does not process the data, and the core network processes the data.

It is to be noted that, in the embodiment and subsequent embodiments, the processing modes of the core network for the at least one piece of data may be different based on different processing requests, or the processing mode may be determined by the core network itself. For example, a processing process may be as follows: the core network determines the modality to which each piece of data belongs according to the at least one identifier, and determines a quality of service of the corresponding data in a transmission process according to the modality. The processing of the data by the core network may be different from that by the base station, and the determining of the quality of service is not limited to that described above.

FIG. 8 is a flow chart showing yet another method for sending multimodal data according to an embodiment of the present disclosure. As shown in FIG. 8, the centralized processing device is disposed at a server, and sending the at least one piece of data and the at least one identifier to the centralized processing device includes step S1037.

In step S1037, the at least one piece of data, the at least one identifier, a fourth processing request and a fifth processing request are sent to a base station, in which the fourth processing request is configured to request the base station to process the at least one piece of data and to send the at least one identifier, the fifth processing request and the at least one piece of data processed to a core network, and the fifth processing request is configured to request the core network to further process the at least one piece of data processed by the base station and to send the at least one identifier and the at least one piece of data further processed to the server.

In an embodiment, when the centralized processing device is disposed at the server, the terminal needs to travel through the base station and the core network in a process of sending the at least one piece of data and the at least one identifier to the core network.

The terminal may also send the fourth processing request and the fifth processing request when sending the at least one piece of data and the at least one identifier to the base station, and request the base station to process the at least one piece of data and to send the at least one identifier, the fifth processing request and the at least one piece of data processed to the core network through the fourth processing request.

The core network is requested to further process the at least one piece of data processed by the base station and to send the at least one identifier and the at least one piece of data further processed to the server through the fifth processing request, so that the base station and the core network process the data, respectively.

In some embodiments, the centralized processing device is disposed at a server, and sending the at least one piece of data and the at least one identifier to the centralized processing device includes sending the at least one piece of data and the at least one identifier to a base station, in which the at least one piece of data and the at least one identifier are contained in third preset information, and the base station sends the third preset information to a core network in a transparent transmission manner by default, and the core network sends the third preset information to the server in a transparent transmission manner by default; or sending the at least one piece of data and the at least one identifier to a base station, in which the at least one piece of data and the at least one identifier are contained in fourth preset information, and the base station sends the fourth preset information to a core network in a transparent transmission manner by default, and the core network processes contents in the fourth preset information by default and sends the fourth preset information processed to the server; or sending the at least one piece of data and the at least one identifier to a base station, in which the at least one piece of data and the at least one identifier are contained in fifth preset information, the base station processes contents in the fifth preset information by default and sends the fifth preformation processed to a core network, and the core network sends the fifth preset information processed to the server in a transparent transmission manner by default; or sending the at least one piece of data and the at least one identifier to a base station, in which the at least one piece of data and the at least one identifier are contained in sixth preset information; the base station processes contents in the sixth preset information by default and sends the sixth preset information processed to a core network; the core network further processes the sixth preset information by default and sends the sixth preset information further processed to the server.

In an embodiment, the base station and the core network may also decide to transparently transmit or process the data in an implicit manner in addition to the above-mentioned embodiments where the base station and the core network decide to transparently transmit or process the data according to the transparent transmission indication or the transparent transmission request sent by the terminal.

For example, if the base station and the server transparently transmit contents in the third preset information by default, the base station will transparently transmit the at least one piece of data to the core network by default, and the base station will transparently transmit the at least one piece of data to the server by default when the terminal provides the at least one piece of data and the at least one identifier in the third preset information and sends the third preset information to the base station.

For example, if the base station transparently transmits the fourth preset information by default, and the core network processes contents in the fourth preset information by default, then the base station will transparently transmit the fourth preset information to the core network by default, and the core network will process the at least one piece of data in the fourth preset information when the terminal provides the at least one piece of data and the at least one identifier in the fourth preset information and sends the fourth preset information to the base station.

For example, if the base station processes contents in the fifth preset information by default, and the core network transparently transmits the fourth preset information by default, then the base station will process the at least one piece of data in the fifth preset information by default and send the processed fifth preset information to the core network, and the core network will transparently transmit the processed fourth preset information to the server when the terminal provides the at least one piece of data and the at least one identifier in the fifth preset information and sends the fifth preset information to the base station.

For example, if both the base station and the core network process the sixth preset information by default, the base station will process the at least one piece of data in the sixth preset information by default and send the sixth preset information processed to the core network, and the core network will further process the sixth preset information by default and send the sixth preset information further processed to the server when the terminal provides at least one piece of data and at least one identifier in the sixth preset information and sends the sixth preset information to the base station.

It is to be noted that, the terminal may determine whether the base station and the core network need to process the at least one piece of data, and accordingly decide to select which preset information to carry the at least one piece of data. For example, when the base station and the server need to send the at least one piece of data in a transparent transmission manner, the at least one piece of data and the at least one identifier can be provided in the third preset information and sent to the base station. For example, when the base station and the server need to process the at least one piece of data, the at least one piece of data and the at least one identifier may be provided in the sixth preset information and sent to the base station.

In some embodiments, the at least one piece of data and at least one identifier are contained in a physical uplink control channel or a physical uplink shared channel.

In an embodiment, the at least one piece of data and at least one identifier sent by the terminal to the base station may be contained in the physical uplink control channel, for example, a scheduling request (SR). Alternatively, the at least one piece of data and at least one identifier may also be contained in the physical uplink shared channel, for example, in a media access control control element (MAC CE), specifically in a buffer status report (BSR), for example, in a MAC protocol data unit (PDU), a radio link control (RLC) PDU, a packet data convergence protocol (PDCP) PDU, or a service data adaptation protocol (SDAP) PDU.

In some embodiments, the at least one piece of data and the at least one identifier are sent in a same transmission process or in different transmission processes.

In an embodiment, the at least one piece of data and the at least one identifier sent by the terminal may be sent in a same transmission process or in different transmission processes.

For example, the terminal may first send the SR to the base station in the physical uplink control channel to request a resource, the at least one identifier is provided in the SR, and then the terminal sends the MAC PDU through the requested resource, and the at least one piece of data may be provided in the MAC PDU. For example, the terminal may also send at least one piece of data and at least one identifier in the MAC PDU at a time.

FIG. 9 is a flow chart showing yet another method for sending multimodal data according to an embodiment of the present disclosure. As shown in FIG. 9, before sending the at least one piece of data and the at least one identifier to the centralized processing device, the method further includes step S104.

In step S104, a first correspondence between identifiers and corresponding data is established, in which sending the at least one piece of data and the at least one identifier to the centralized processing device includes step S1038.

In step S1038, the at least one piece of data, the at least one identifier and the first correspondence are sent to the centralized processing device.

In an embodiment, since the terminal can send the at least one piece of data and the at least one identifier in a single sending process, for example, multiple pieces of data and multiple identifiers are sent in a single sending process, in order to enable the centralized processing device to clearly recognize the correspondence between the identifiers and the data, and the first correspondence between the identifiers and the data may also be established. The terminal also sends the first correspondence when sending the at least one piece of data and the at least one identifier, so that the centralized processing device can also receive the first correspondence when receiving the at least one piece of data and the at least one identifier, so as to determine the data corresponding to each of the at least one identifier in the at least one piece of data according to the first correspondence, and then accurately determine the modality to which each piece of data belongs.

It is to be noted that a second correspondence may be pre-stored in the terminal and the centralized processing device, and the second correspondence stipulates a correspondence between the at least one piece of data and the at least one identifier. For example, the second correspondence indicates that an identifier is located in a scheduling request, and the data is located in a resource requested by the scheduling request, or the second correspondence indicates that an identifier is located in an $i^{th}$ bit of the MAC PDU, and data corresponding to the identifier is located in a $j^{th}$ bit of the MAC PDU. Then, the terminal can send the at least one piece of data and the at least one identifier according to the second correspondence, and the centralized processing device can also determine each identifier and data corresponding to the identifier according to the second correspondence.

FIG. 10 is a flow chart showing a method for processing multimodal data according to an embodiment of the present disclosure. The method shown in the embodiment may be applied to a centralized processing device. The centralized processing device may be an entity device, or a function integrated on the entity device. The entity device shown may be a base station, a core network, or a server.

As shown in FIG. 10, the method may include step S201, step S202, step S203, and step S204.

In step S201, at least one piece of data and at least one identifier from a terminal are received.

In step S202, data corresponding to each of the at least one identifier in the at least one piece of data are determined.

In step S203, a processing mode corresponding to each of the at least one identifier is determined.

In step S204, the data corresponding to each of the at least one identifier is processed according to the processing mode.

In an embodiment, the centralized processing device can receive the at least one piece of data and the at least one identifier sent by the terminal. It is to be noted that the at least one piece of data and the at least one identifier can be directly sent to the centralized processing device by the terminal, for example, the centralized processing device is disposed at the base station. Alternatively, the at least one piece of data and the at least one identifier can also be indirectly sent to the centralized processing device by the terminal, for example, the centralized processing device is disposed in the core network or server.

As the centralized processing server can not only receive the at least one piece of data, but also receive the identifier corresponding to the modality of each piece of data, the centralized processing device can determine the modality of each piece of data according to the identifier, so that the data can be processed accurately according to the processing mode corresponding to the modality, and then accurate processing results can be obtained.

FIG. 11 is a flow chart showing another method for processing multimodal data according to an embodiment of the present disclosure. As shown in FIG. 11, before determining the data corresponding to each of the at least one identifier in the at least one piece of data, the method further includes step S205.

In step S205, a first correspondence from the terminal is received, in which determining the data corresponding to each of the at least one identifier in the at least one piece of data includes step S2041.

In step S2041, the data corresponding to each of the at least one identifier in the at least one piece of data is determined according to the first correspondence.

In an embodiment, since the terminal can send the at least one piece of data and the at least one identifier in a single sending process, for example, multiple pieces of data and multiple identifiers are sent in a single sending process, in order to enable the centralized processing device to clearly recognize the correspondence between the identifiers and the data, and the first correspondence between the identifiers and the data may also be established. The terminal also sends the first correspondence when sending the at least one piece of data and the at least one identifier, so that the centralized processing device can also receive the first correspondence when receiving the at least one piece of data and the at least one identifier, so as to determine the data corresponding to each of the at least one identifier in the at least one piece of data according to the first correspondence, and then accurately determine the modality to which each piece of data belongs.

FIG. 12 is a flow chart showing yet another method for processing multimodal data according to an embodiment of the present disclosure. As shown in FIG. 12, determining the data corresponding to each of the at least one identifier in the at least one piece of data include step S2042.

In step S2042, the data corresponding to each of the at least one identifier in the at least one piece of data is determined according to a pre-stored second correspondence.

In an embodiment, the second correspondence may be pre-stored in the terminal and the centralized processing device, and the second correspondence stipulates a correspondence between the at least one piece of data and the at least one identifier. For example, the second correspondence indicates that an identifier is located in a scheduling request, and the data is located in a resource requested by the scheduling request, or the second correspondence indicates that an identifier is located in an $i^{th}$ bit of the MAC PDU, and data corresponding to the identifier is located in a j$^{th}$ bit of the MAC PDU. Then, the terminal can send the at least one piece of data and the at least one identifier according to the second correspondence, and the centralized processing device can also determine each identifier and data corresponding to the identifier according to the second correspondence.

In some embodiments, the centralized processing device is disposed at at least one of: a base station, a core network, or a server.

In some embodiments, the server is a mobile edge computing (abbreviated as MEC) server.

Corresponding to the foregoing embodiments of the method for sending multimodal data and the method for processing multimodal data, the present disclosure also provides embodiments of an apparatus for sending multimodal data and an apparatus for processing multimodal data.

FIG. 13 is a block diagram showing an apparatus for sending multimodal data according to an embodiment of the present disclosure. The apparatus shown in the embodiment may be applied to a terminal. The terminal includes, but is not limited to, an electronic device, such as a mobile phone, a tablet computer, a wearable device, a sensor, and an Internet of Things device.

The terminal can communicate with a base station as a user equipment. The base station may be a 5G base station, or a 6G base station. The base station can further communicate with a core network, and the core network can further communicate with a server in a network, for example, based on an application programming interface (API).

As shown in FIG. 13, the apparatus may include a data acquiring module 101, an identifier determining module 102, and a sending module 103.

The data acquiring module 101 is configured to acquire at least one piece of data, in which each of the at least one piece of data belongs to a different modality.

The identifier determining module 102 is configured to determine an identifier corresponding to the modality to which each piece of data belongs.

The sending module 103 is configured to send the at least one piece of data and at least one identifier to a centralized processing device.

In some embodiments, the centralized processing device is disposed at a base station, and the sending module is configured to send the at least one piece of data and the at least one identifier to the base station.

In some embodiments, the centralized processing device is disposed in a core network, and the sending module is configured to send the at least one piece of data, the at least one identifier and a first transparent transmission indication to a base station, in which the first transparent transmission indication is configured to indicate the base station to send the at least one piece of data and the at least one identifier to the core network in a transparent transmission manner.

In some embodiments, the centralized processing device is disposed in a core network, and the sending module is configured to send the at least one piece of data, the at least one identifier, and a first processing request to a base station, in which the first processing request is configured to request the base station to process the at least one piece of data and to send the at least one identifier and the at least one piece of data processed to the core network.

In some embodiments, the centralized processing device is disposed at a server, and the sending module is configured to send the at least one piece of data, the at least one identifier, a second transparent transmission indication and a third transparent transmission indication to a base station, in which the second transparent transmission indication is configured to indicate the base station to send the at least one piece of data, the at least one identifier and the third transparent transmission indication to a core network in a transparent transmission manner, and the third transparent transmission indication is configured to indicate the core network to send the at least one piece of data and the at least one identifier to the server in a transparent transmission manner.

In some embodiments, the centralized processing device is disposed at a server, and the sending module is configured to send the at least one piece of data, the at least one identifier, a second processing request and a fourth transparent transmission indication to a base station, in which the second processing request is configured to request the base station to process the at least one piece of data and to send the at least one identifier, the fourth transparent transmission indication and the at least one piece of data processed to the core network, and the fourth transparent transmission indication is configured to indicate the core network to send the at least one identifier and the at least one piece of data processed by the base station to the server in a transparent transmission manner.

In some embodiments, the centralized processing device is disposed at a server, and the sending module is configured to send the at least one piece of data, the at least one identifier, a fifth transparent transmission indication, and a third processing request to a base station, in which the fifth transparent transmission indication is configured to indicate the base station to send the at least one piece of data, the at least one identifier, and the third processing request to a core network in a transparent transmission manner, and the third processing request is configured to request the core network to process the at least one piece of data and to send the at least one identifier and the at least one piece of data processed to the server.

In some embodiments, the centralized processing device is disposed at a server, and the sending module is configured to send the at least one piece of data, the at least one identifier, a fourth processing request and a fifth processing request to a base station, in which the fourth processing request is configured to request the base station to process the at least one piece of data and to send the at least one identifier, the fifth processing request and the at least one piece of data processed to a core network, and the fifth processing request is configured to request the core network to further process the at least one piece of data processed by the base station and to send the at least one identifier and the at least one piece of data further processed to the server.

In some embodiments, the at least one piece of data and the at least one identifier are contained in a physical uplink control channel or a physical uplink shared channel.

In some embodiments, the at least one piece of data and the at least one identifier are sent in a same transmission process or in different transmission processes.

FIG. 14 is a block diagram showing another apparatus for sending multimodal data according to an embodiment of the present disclosure. As shown in FIG. 14, the apparatus further includes a relationship establishing module 104.

The relationship establishing module 104 is configured to establish a first correspondence between identifiers and corresponding data, in which the sending module 103 is configured to send the at least one piece of data, the at least one identifier and the first correspondence to the centralized processing device.

FIG. 15 is a block diagram showing an apparatus for processing multimodal data according to an embodiment of the present disclosure. The apparatus shown in the embodiment may be applied to a centralized processing device. The centralized processing device may be an entity device, or a function integrated on the entity device. The entity device shown may be a base station, a core network, or a server.

As shown in FIG. 15, the apparatus may include a first receiving module 201, a data determining module 202, a mode determining module 203, and a processing module 204.

The first receiving module 201 is configured to receive at least one piece of data and at least one identifier from a terminal.

The data determining module 202 is configured to determine data corresponding to each of the at least one identifier in the at least one piece of data.

The mode determining module 203 is configured to determine a processing mode corresponding to each of the at least one identifier.

The processing module 204 is configured to process the data corresponding to each of the at least one identifier according to the processing mode.

Figure 16:
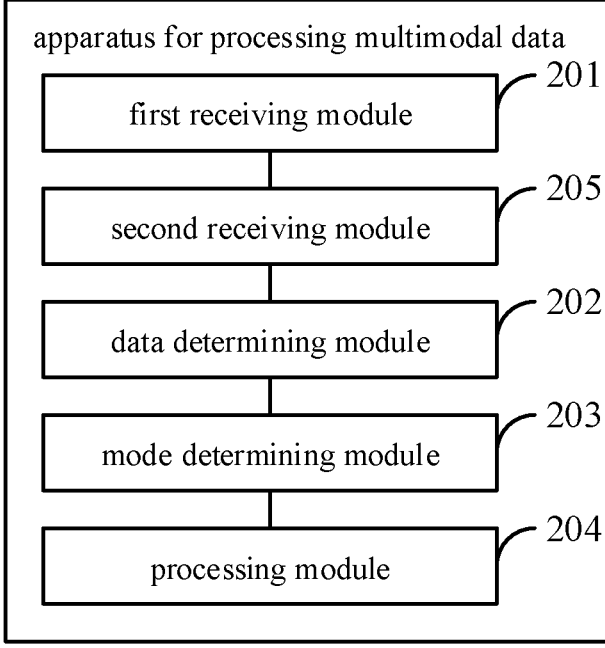
FIG. 16 is a block diagram showing another apparatus for processing multimodal data according to an embodiment of the present disclosure.

FIG. 16 is a block diagram showing another apparatus for processing multimodal data according to an embodiment of the present disclosure. As shown in FIG. 16, the apparatus further includes a second receiving module 205.

The second receiving module 205 is configured to receive a first correspondence from the terminal.

The data determining module 202 is configured to determine the data corresponding to each of the at least one identifier in the at least one piece of data according to the first correspondence.

In some embodiments, the data determining module is configured to determine the data corresponding to each of the at least one identifier in the at least one piece of data according to a pre-stored second correspondence.

In some embodiments, the centralized processing device is disposed at at least one of: a base station, a core network, or a server.

In some embodiments, the server is a mobile edge computing server.

With respect to the apparatus in the above-mentioned embodiments, the specific manners for performing operations for individual modules therein have been described in detail in the embodiments regarding the methods, which will not be elaborated herein.

Since the apparatus embodiments substantially correspond to the method embodiments, reference is made to the partial description of the method embodiments. The above-described apparatus embodiments are merely for the purpose of illustration, in which the modules described as separate components may be or may not be physically separated, and the components displayed as modules may be or may not be physical modules, that is, either located at one place or distributed onto a plurality of network modules. The object of embodiments of the present disclosure may be achieved by some or all of the modules in accordance with practical requirements. It would be appreciated and executable by those skilled in the art without creative efforts.

An embodiment of the present disclosure also provides an electronic device, including a processor; and a memory for storing instructions executable by the processor; in which the processor is configured to implement the method for sending multimodal data described in any of the above-mentioned embodiments, and/or the method for processing multimodal data described in any of the above-mentioned embodiments.

An embodiment of the present disclosure further provides a computer-readable storage medium having stored therein a computer program that, when executed by a processor, causes the processor to implement steps of the method for sending multimodal data described in any of the above-mentioned embodiments, and/or steps of the method for processing multimodal data described in any of the above-mentioned embodiments.

Figure 17:
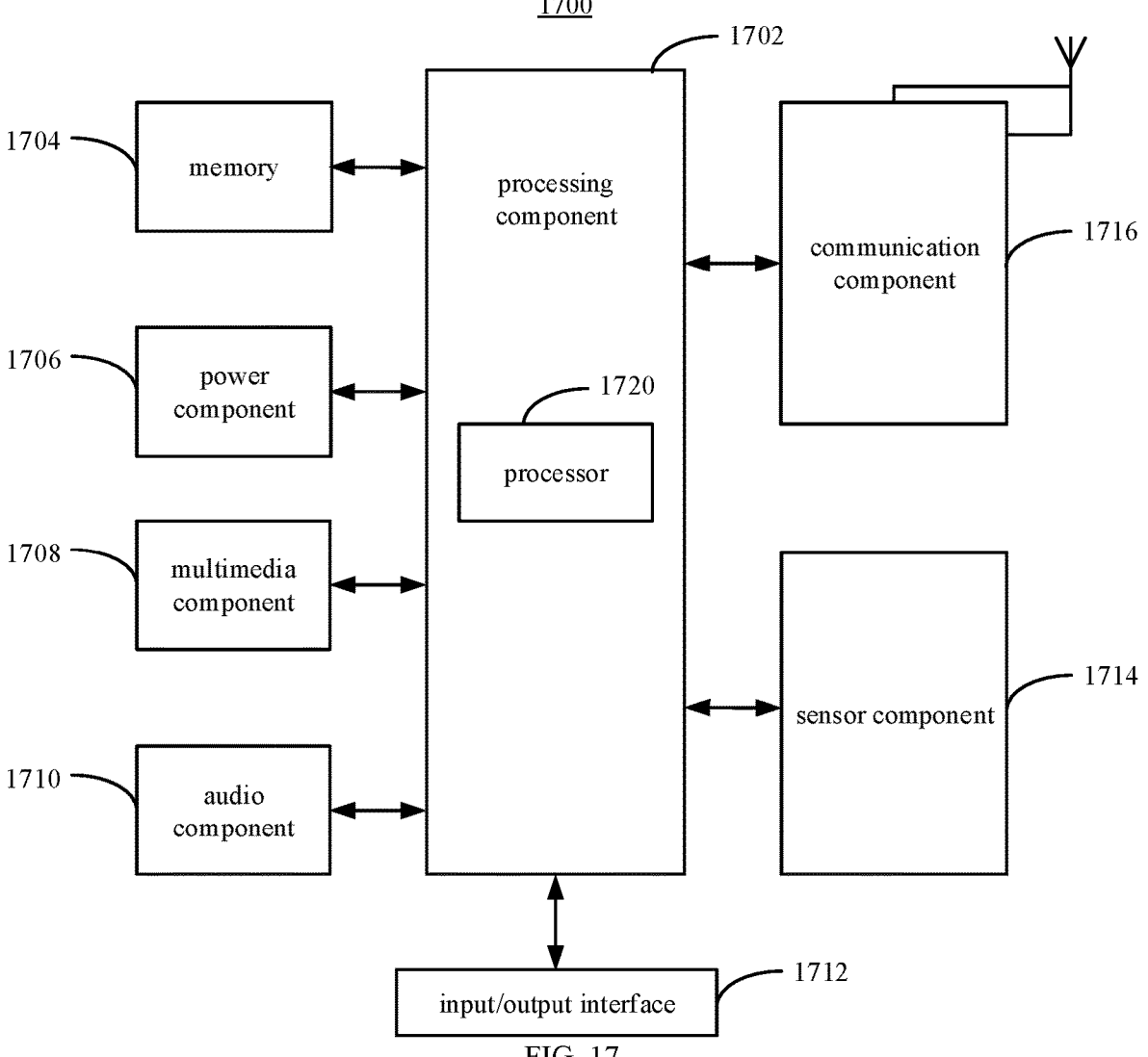
FIG. 17 is a block diagram showing an apparatus for sending multimodal data and/or processing multimodal data according to an embodiment of the present disclosure.

FIG. 17 is a schematic block diagram showing an apparatus 1700 for sending multimodal data and/or processing multimodal data according to an embodiment of the present disclosure. For example, the apparatus 1700 can be a mobile phone, a computer, a digital broadcast terminal, a messaging device, a game console, a tablet device, a medical device, a fitness device, a personal digital assistant, or the like.

Referring to FIG. 17, the apparatus 1700 may include one or more of the following components: a processing component 1702, a memory 1704, a power component 1706, a multimedia component 1708, an audio component 1710, an input/output (I/O) interface 1712, a sensor component 1714, and a communication component 1716.

The processing component 1702 typically controls overall operations of the apparatus 1700, such as the operations associated with display, phone calls, data communications, camera operations, and recording operations. The processing component 1702 can include one or more processors 1720 to execute instructions to perform all or some of the steps in the above-described method. Moreover, the processing component 1702 may include one or more modules which facilitate the interaction between the processing component 1702 and other components. For instance, the processing component 1702 may include a multimedia module to facilitate the interaction between the multimedia component 1708 and the processing component 1702.

The memory 1704 is configured to store various types of data to support the operation of the apparatus 1700. Examples of such data include instructions for any applications or methods operated on the apparatus 1700, contact data, phonebook data, messages, pictures, videos, etc. The memory 1704 may be implemented using any type of volatile or non-volatile memory devices, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or optical disk.

The power component 1706 provides power to various components of the apparatus 1700. The power component 1706 may include a power management system, one or more power sources, and any other components associated with the generation, management, and distribution of power in the apparatus 1700.

The multimedia component 1708 includes a screen providing an output interface between the apparatus 1700 and a user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of time and a pressure associated with the touch or swipe action. In some embodiments, the multimedia component 1708 includes a front camera and a rear camera. The front camera and the rear camera may receive an external multimedia datum while the apparatus 1700 is in an operation mode, such as a photographing mode or a video mode. Each of the front camera and the rear camera may be a fixed optical lens system or have focus and optical zoom capability.

The audio component 1710 is configured to output and input audio signals. For example, the audio component 1710 includes a microphone (MIC) configured to receive an external audio signal when the apparatus 1700 is in an operation mode, such as a call mode, a recording mode, and a voice recognition mode. The received audio signal may be further stored in the memory 1704 or transmitted via the communication component 1716. In some embodiments, the audio component 1710 further includes a speaker to output audio signals.

The I/O interface 1712 provides an interface between the processing component 1702 and peripheral interface modules, such as keyboards, click wheels, buttons, and the like. The buttons may include, but are not limited to, a home button, a volume button, a starting button, and a locking button.

The sensor component 1714 includes one or more sensors to provide status assessments of various aspects of the apparatus 1700. For instance, the sensor component 1714 may detect an open/closed status of the apparatus 1700, relative positioning of components, e.g., the display and the keypad, of the apparatus 1700, a change in position of the apparatus 1700 or an component of the apparatus 1700, a presence or absence of user contact with the apparatus 1700, an orientation or an acceleration/deceleration of the apparatus 1700, and a change in temperature of the apparatus 1700. The sensor component 1714 may include a proximity sensor configured to detect the presence of nearby objects without any physical contact. The sensor component 1714 may include a light sensor, such as a CMOS or CCD image sensor, for use in imaging applications. In some embodiments, the sensor component 1714 may further include an accelerometer sensor, a gyroscope sensor, a magnetic sensor, a pressure sensor, or a temperature sensor.

The communication component 1716 is configured to facilitate communication, wired or wireless, between the apparatus 1700 and other devices. The apparatus 1700 can access a wireless network based on a communication standard, such as WiFi, 2G, or 3G, 4G LTE, 5G NR or a combination thereof. In an illustrative embodiment, the communication component 1716 receives a broadcast signal or broadcast associated information from an external broadcast management system via a broadcast channel. In an illustrative embodiment, the communication component 1716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the apparatus 1700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-mentioned method.

In an illustrative embodiment, there is also provided a non-transitory computer readable storage medium including instructions, such as included in the memory 1704, executable by the processor 1720 in the apparatus 1700, for completing the above-mentioned method. For example, the non-transitory computer-readable storage medium may be a ROM, a random access memory (RAM), a CD-ROM, a magnetic tape, a floppy disc, an optical data storage device, and the like.

According to the embodiments of the present disclosure, the identifier corresponding to the modality of each piece of data can be determined, such that not only can at least one piece of data be sent to the centralized processing device, but also the identifier corresponding to the modality of each piece of data can be sent to the centralized processing device, so as to enable the centralized processing device to determine the modality of each piece of data according to the identifier, thus accurately processing data according to the processing mode corresponding to the modality to obtain an accurate processing result.

Other embodiments of the present disclosure will be apparent to those skilled in the art from consideration of the specification and practice of the present disclosure described here. The present disclosure is intended to cover any variations, uses, or adaptations of the present disclosure following the general principles thereof and including such departures from the present disclosure as come within known or customary practice in the art. It is intended that the specification and examples be considered as illustrative only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the embodiments of the present disclosure only be limited by the appended claims.

It is to be noted that in this context, relational terms such as first and second are used solely to distinguish one entity or operation from another entity or operation, it does not necessarily require or imply any such actual relationship or sequence between these entities or operations. The term "include", "comprise" or any other variation thereof is intended to cover a non-exclusive inclusion, so that a process, method, article or device that includes a series of elements does not only include those elements, but also includes other elements that are not explicitly listed, or also includes elements inherent in such a process, method, article or device. Without further restrictions, an element defined by the statement "including a . . . " does not exclude the existence of another identical element in the process, method, article or device that includes the element.

The methods and apparatuses provided by the embodiments of the present disclosure have been described in detail above, and specific examples are used to illustrate the principle and implementation of the present disclosure. The description of the above embodiments is only used to help understand the methods and core ideas of the present disclosure. At the same time, for those skilled in the art, there will be some changes in the specific implementation and application scope according to the idea of the present disclosure. In summary, the content of the specification should not be construed as a limitation to the present disclosure.

What is claimed is:

1. A method for sending multimodal data, comprising:
   acquiring, by a terminal, at least two pieces of data, wherein each of the at least two pieces of data belongs to a different modality;

determining, by the terminal, an identifier corresponding to the modality to which each piece of data belongs; and sending, by the terminal, the at least two pieces of data and at least two identifiers to a centralized processing device;

wherein the centralized processing device is disposed at a server, and sending the at least two pieces of data and the at least two identifiers to the centralized processing device comprises one of following acts:

sending, by the terminal, the at least two pieces of data, the at least two identifiers, a second transparent transmission indication and a third transparent transmission indication to a base station, wherein the second transparent transmission indication is configured to indicate the base station to send the at least two pieces of data, the at least two identifiers and the third transparent transmission indication to a core network in a transparent transmission manner, and the third transparent transmission indication is configured to indicate the core network to send the at least two pieces of data and the at least two identifiers to the server in a transparent transmission manner;

sending, by the terminal, the at least two pieces of data, the at least two identifiers, a second processing request and a fourth transparent transmission indication to a base station, wherein the second processing request is configured to request the base station to process the at least two pieces of data and to send the at least two identifiers, the fourth transparent transmission indication and the at least two pieces of data processed to a core network, and the fourth transparent transmission indication is configured to indicate the core network to send the at least two identifiers and the at least two pieces of data processed by the base station to the server in a transparent transmission manner;

sending, by the terminal, the at least two pieces of data, the at least two identifiers, a fifth transparent transmission indication, and a third processing request to a base station, wherein the fifth transparent transmission indication is configured to indicate the base station to send the at least two pieces of data, the at least two identifiers, and the third processing request to a core network in a transparent transmission manner, and the third processing request is configured to request the core network to process the at least two pieces of data and to send the at least two identifiers and the at least two pieces of data processed to the server; or sending, by the terminal, the at least two pieces of data, the at least two identifiers, a fourth processing request and a fifth processing request to a base station, wherein the fourth processing request is configured to request the base station to process the at least two pieces of data and to send the at least two identifiers, the fifth processing request and the at least two pieces of data processed to a core network, and the fifth processing request is configured to request the core network to further process the at least two pieces of data processed by the base station and to send the at least two identifiers and the at least two pieces of data further processed to the server.

2. The method of claim 1, wherein the at least two pieces of data and the at least two identifiers are contained in a physical uplink control channel or a physical uplink shared channel.

3. The method of claim 2, wherein the at least two pieces of data and the at least two identifiers are sent in a same sending process or in different sending processes.

4. An electronic device, comprising:
a processor; and
a memory for storing instructions executable by the processor;
wherein the processor is configured to implement the method of 3.

5. An electronic device, comprising:
a processor; and
a memory for storing instructions executable by the processor;
wherein the processor is configured to implement the method of 2.

6. The method of claim 1, wherein before sending the at least two pieces of data and the at least two identifiers to the centralized processing device, the method further comprises:
establishing a first correspondence between identifiers and corresponding data;
wherein sending the at least two pieces of data and the at least two identifiers to the centralized processing device comprises:
sending the at least two pieces of data, the at least two identifiers and the first correspondence to the centralized processing device.

7. An electronic device, comprising:
a processor; and
a memory for storing instructions executable by the processor;
wherein the processor is configured to implement the method of 6.

8. An electronic device, comprising:
a processor; and
a memory for storing instructions executable by the processor;
wherein the processor is configured to implement the method for sending multimodal data of claim 1.

9. A method for processing multimodal data, comprising:
receiving, by a centralized processing device, at least two pieces of data and at least two identifiers from a terminal;
determining, by the centralized processing device, data corresponding to each of the at least two identifiers in the at least two pieces of data;
determining, by the centralized processing device, a processing mode corresponding to each of the at least two identifiers; and
processing, by the centralized processing device, the data corresponding to each of the at least two identifiers according to the processing mode,
wherein the centralized processing device is disposed in a core network,
the terminal sends the at least two pieces of data, the at least two identifiers and a first transparent transmission indication to a base station, and the base station sends the at least two pieces of data and the at least two identifiers to the core network in a transparent transmission manner according to the first transparent transmission indication; or
the terminal sends the at least two pieces of data, the at least two identifiers, and a first processing request to a base station, and the base station, according to the first processing request, processes the at least two pieces of data and sends the at least two identifiers and the at least two pieces of data processed to the core network, or wherein the centralized processing device is disposed at a server, the terminal sends the at least two pieces of data, the at least two identifiers, a second transparent transmission indication and a third transparent transmission indication to a base station, the base station sends the at least two pieces of data and the at least two identifiers to a core network in a transparent transmission manner according to the second transparent transmission indication, and the core network sends the at least two pieces of data and the at least two identifiers to the server in a transparent transmission manner according to the third transparent transmission indication;

the terminal sends the at least two pieces of data, the at least two identifiers, a second processing request and a fourth transparent transmission indication to a base station, the base station, according to the second processing request, processes the at least two pieces of data and sends the at least two identifiers, the fourth transparent transmission indication and the at least two pieces of data processed to a core network, and the core network sends the at least two identifiers and the at least two pieces of data processed by the base station to the server in a transparent transmission manner according to the fourth transparent transmission indication;

the terminal sends the at least two pieces of data, the at least two identifiers, a fifth transparent transmission indication, and a third processing request to a base station, the base station sends the at least two pieces of data, the at least two identifiers, and the third processing request to a core network in a transparent transmission manner according to the fifth transparent transmission indication, and the core network, according to the third processing request, processes the at least two pieces of data and sends the at least two identifiers and the at least two pieces of data processed to the server; or the terminal sends the at least two pieces of data, the at least two identifiers, a fourth processing request and a fifth processing request to a base station, the base station, according to the fourth processing request, processes the at least two pieces of data and sends the at least two identifiers, the fifth processing request and the at least two pieces of data processed to a core network, and the core network, according to the fifth processing request, further processes the at least two pieces of data processed by the base station and sends the at least two identifiers and the at least two pieces of data further processed to the server.

10. The method of claim 9, wherein before determining the data corresponding to each of the at least two identifiers in the at least two pieces of data, the method further comprises:

receiving, by the centralized processing device, a first correspondence from the terminal;

wherein determining the data corresponding to each of the at least two identifiers in the at least two pieces of data comprises:

determining, by the centralized processing device, the data corresponding to each of the at least two identifiers in the at least two pieces of data according to the first correspondence.

11. An electronic device, comprising:
a processor; and
a memory for storing instructions executable by the processor;

wherein the processor is configured to implement the method of claim 10.

12. The method of claim 9, wherein determining the data corresponding to each of the at least two identifiers in the at least two pieces of data comprises:

determining, by the centralized processing device, the data corresponding to each of the at least two identifiers in the at least two pieces of data according to a pre-stored second correspondence.

13. An electronic device, comprising:
a processor; and
a memory for storing instructions executable by the processor;

wherein the processor is configured to implement the method of claim 12.

14. The method of claim 9, wherein the server is a mobile edge computing server.

15. An electronic device, comprising:
a processor; and
a memory for storing instructions executable by the processor;

wherein the processor is configured to implement the method of claim 9.

16. A method for sending multimodal data, comprising:

acquiring, by a terminal, at least two pieces of data, wherein each of the at least two pieces of data belongs to a different modality;

determining, by the terminal, an identifier corresponding to the modality to which each piece of data belongs; and sending, by the terminal, the at least two pieces of data and at least two identifiers to a centralized processing device;

wherein sending the at least two pieces of data and the at least two identifiers to the centralized processing device comprises one of the following acts:

sending, by the terminal, the at least two pieces of data, the at least two identifiers and a first transparent transmission indication to a base station, wherein the first transparent transmission indication is configured to indicate the base station to send the at least two pieces of data and the at least two identifiers to a core network in a transparent transmission manner, wherein the centralized processing device is disposed in the core network; or sending, by the terminal, the at least two pieces of data, the at least two identifiers, and a first processing request to a base station, wherein the first processing request is configured to request the base station to process the at least two pieces of data and to send the at least two identifiers and the at least two pieces of data processed to a core network, wherein the centralized processing device is disposed in the core network.

17. The method of claim 16, wherein the at least two pieces of data and the at least two identifiers are contained in a physical uplink control channel or a physical uplink shared channel.

18. The method of claim 17, wherein the at least two pieces of data and the at least two identifiers are sent in a same sending process or in different sending processes.

19. The method of claim 16, wherein before sending the at least two pieces of data and the at least two identifiers to the centralized processing device, the method further comprises:

establishing a first correspondence between identifiers and corresponding data;

wherein sending the at least two pieces of data and the at least two identifiers to the centralized processing device comprises:

sending the at least two pieces of data, the at least two identifiers and the first correspondence to the centralized processing device.

20. An electronic device, comprising:

a processor; and a memory for storing instructions executable by the processor;

wherein the processor is configured to implement the method of claim 16.

\* \* \* \* \*